Oct. 28, 1969  R. E. HARTMAN  3,474,818
COMBINED PLUG AND CHECK VALVE
Filed May 2, 1966  2 Sheets-Sheet 1
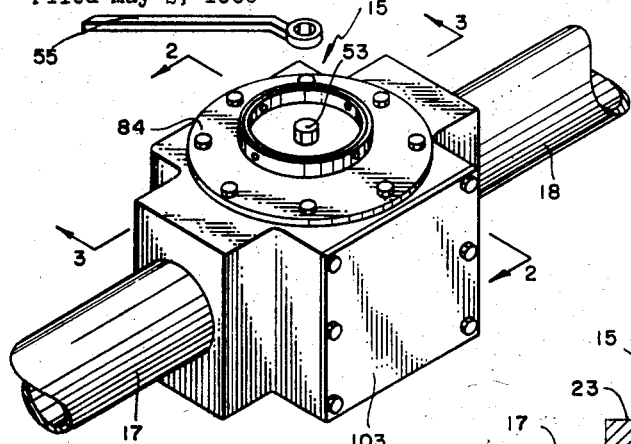
FIG. 1
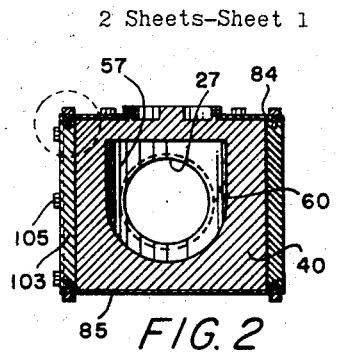
FIG. 2
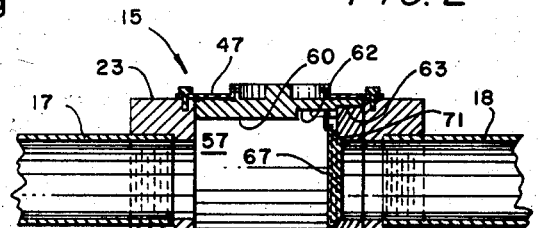
FIG. 3
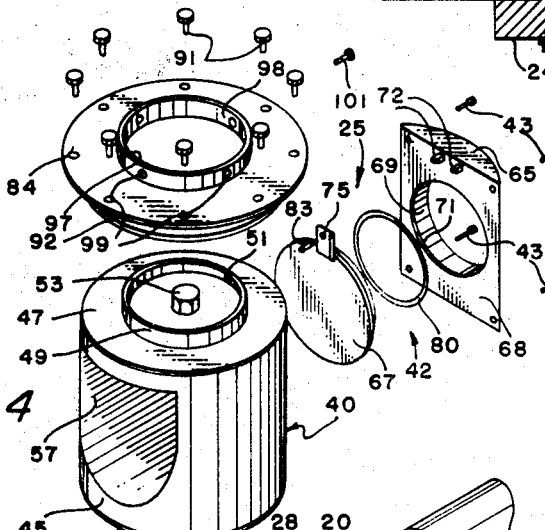
FIG. 4
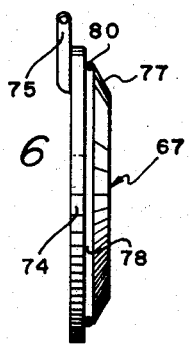
FIG. 5, FIG. 6, FIG. 7
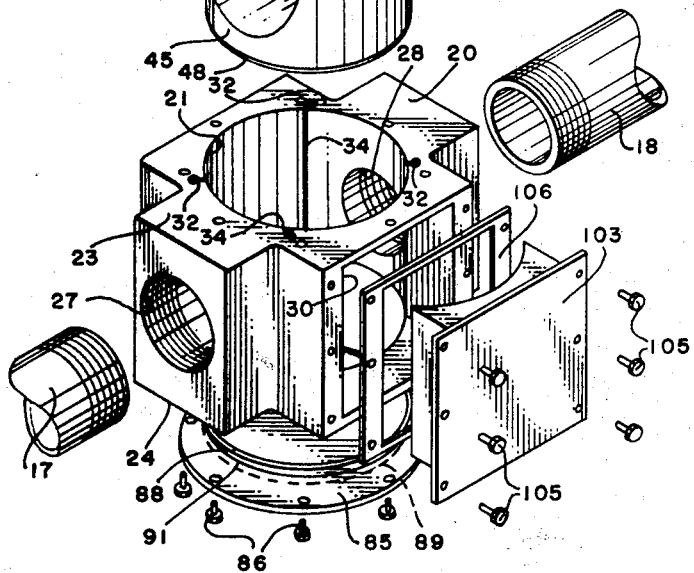
INVENTOR.
RALPH E. HARTMAN
BY John W. Widdowson
Phillip A. Rein
ATTORNEYS Oct. 28, 1969  R. E. HARTMAN  3,474,818
COMBINED PLUG AND CHECK VALVE
Filed May 2, 1966  2 Sheets-Sheet 2

INVENTOR.
RALPH E. HARTMAN
BY
ATTORNEYS

United States Patent Office 3,474,818
Patented Oct. 28, 1969

3,474,818
COMBINED PLUG AND CHECK VALVE
Ralph E. Hartman, 704 Bitting Bldg.,
Wichita, Kans. 67203
Filed May 2, 1966, Ser. No. 546,867
Int. Cl. E03b; F16k 5/00; F17d
U.S. Cl. 137—269.5                  4 Claims

ABSTRACT OF THE DISCLOSURE

This invention is a check valve means to control fluid flow having a rotatable cylindrical valve member extended transversely of fluid flow passageways and rotatable from a first flow position to an intermediate position stopping flow through the passageways or to a third position permitting flow in the opposite direction only relative to the first position. More particularly, this invention is a valve means having a rotatable valve assembly provided with a flapper member engageable with a valve seat member to permit fluid flow in only one direction, movable to a fully open position to provide unrestricted flow therethrough and having an access plate member providing for the repair and maintenance of the entire valve assembly without fluid loss through the passageways nor requiring that the same be drained before repair is made.

---

Various types of check valves are known to the prior art having a central valve core rotatable to control the direction of fluid flow while preventing fluid flow in an opposite direction. The prior art devices require precise machining to present a rotatable, fluid sealed structure and such devices are subject to constant wear resulting in costly maintenance. Additionally, the prior art devices do not permit repair and maintenance of the critical moving parts during operation in a manner not requiring drainage of the interconnected fluid lines.

In accordance with the present invention, a new valve means for a piping system is provided which includes a unique check valve structure having a rotatable stem or core operable to prevent fluid flow in one direction, and permit flow in the opposite direction, rotatable 180 degrees therefrom to prevent and permit fluid flow in the opposite directions, and rotatable 90 degrees therefrom to stop fluid flow and permit entrance therein for repair and maintenance.

In preferred specific embodiments of the invention, a valve means is provided for a fluid piping system including a valve housing having a central bore in which is mounted a rotatable valve member. The valve housing has a pair of opposed aligned fluid openings and an access opening extended transversely of the bore. The opposite open ends of the bore are closed by upper and lower cap plates in a fluid sealed relationship. The valve member has a fluid channel extended therethrough and an upper portion mountable within an opening in the upper cap plate. The valve member is rotatable to place the fluid channel in axial alignment with the pair of opposed fluid openings and to a second position to place the same in axial alignment with the access opening. At one end of the channel is mounted a valve seat assembly having a valve seat releasably secured to the valve member and a flapper plate pivotally connected thereto operable to cover a central hole in the valve seat to control fluid flow through the pair of fluid openings in one direction. The valve member is rotatable 180 degrees to control fluid flow in the opposite direction and further rotatable to align the channel and the access opening. The access opening is sealed by a cover plate which is removable for repair and maintenance of the valve seat assembly. A plurality of wiper seal members are connected to the valve housing in contact with the rotatable valve member to prevent fluid flow between the pair of fluid openings and access opening. A means for locking the upper portion of the valve member to the upper cap plate in a selected rotational position is provided to prevent unauthorized tampering therewith.

Accordingly, an object of this invention is to provide a new valve means for a fluid flow piping system.

Another object of this invention is to provide a valve means having a rotatable valve member operable to permit and prevent fluid flow in opposite directions.

Still another object of this invention is to provide a valve means including a valve member having a flapper plate therein to permit fluid flow in one direction and prevent fluid flow in the opposite direction, and the valve members being rotatable to another position providing for access to the flapper plate for repair and maintenance without the necessity of draining interconnected fluid pipe lines.

One other object of this invention is to provide a valve means having novel fluid sealing members operable to prevent fluid leakage therefrom under all conditions of operation and during repair and maintenance.

Still another object of this invention is to provide a valve means having a new and novel flapper plate member movable into a fully open position to provide unrestricted fluid flow in one direction and movable into a positive sealing position to stop fluid flow in the opposite direction preventing leakage and mixing of the fluids being conveyed.

Still one other object of this invention is to provide a rotatable, reversible check valve that is operable under all existing fluid flow conditions to reverse the direction or cease existing fluid flow therethrough.

One further object of this invention is to provide a valve means that is economical to manufacture, simple to operate, and easy to maintain.

Various other objects, advantages and features of the invention will become apparent to these skilled in the art from the following discussion, taken in conjunction with the accompanying drawings, in which:

FIG. 1 is a perspective view of the valve means of this invention illustrated as connected to fluid pipe members;

FIG. 2 is a sectional view taken along lines 2—2 in FIG. 1;

FIG. 3 is a sectional view taken along lines 3—3 in FIG. 1;

FIG. 4 is an exploded perspective view of the valve means of this invention and interconnected pipe members;

FIG. 5 is an enlarged view of the portion shown in dotted lines in FIG. 2;

FIG. 6 is an enlarged elevational view of the flapper plate member of this invention;

FIG. 7 is a fragmentary enlarged perspective view of a wiper sealing means of this invention;

Figure 8:
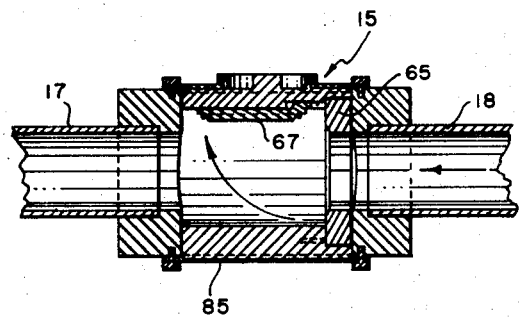
FIG. 8 is a sectional view similar to FIG. 3 illustrating the flapper plate member of this invention in the fully opened position.
Figure 9:
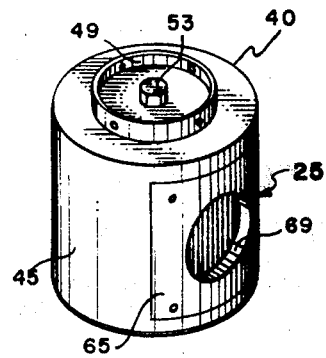
FIG. 9 is a perspective view of a valve member of the valve means of this invention.

The following is a discussion and description of preferred specific embodiments of the new valve means of this invention, such being made with reference to the drawings, whereupon the same reference numerals are used to indicate the same or similar parts and/or structure. It is to be understood that such discussion and description is not to unduly limit the scope of the invention.

Referring to the drawings in detail and in particular to FIGS. 1 and 4, the valve means of this invention, indicated generally at 15, is illustrated in a piping system connected to pipe members 17 and 18 to control fluid flow therebetween. The valve means 15 includes an irregular shaped valve housing 20 having a large central bore 21 extended transversely of upper and lower parallel surfaces 23 and 24, and a cylindrical valve member 25 rotatably mounted within the bore 21. The valve housing 20 has a pair of axially aligned openings 27 and 28 extended transversely and diametrically opposed of the central bore 21 usable alternatively as inlet and outlet fluid openings from the pipe members 17 and 18, respectively, as will be explained. Intermediate of the openings 27 and 28 is an access opening 30 of rectangular shape also extended transversely of the valve housing 20 into the bore 21. A plurality of spaced slots 32 of key hole shape in transverse cross section extend the length of the bore 21 and open thereto. Each slot 32 is adapted to receive a similarly shaped blade-type wiper seal 34 having a central body 35 and an integral laterally extended outer flange 36 for reasons to become obvious. The body 35 is bonded to a centrally positioned elongated rod 38, and the body 35 is under compression in the assembled position to prevent axial movement thereof (FIG. 7). The outer portions of the rod 38 extend outwardly of the opposite ends of the body 35 for ease of assembly into the respective slots 32 whereupon the outer portions are removed after assembly.

As shown in FIG. 4, the valve member 25 has a housing or casing 40 and a flapper valve assembly 42 connected thereto as by bolts 43. The casing 40 has a cylindrical outer surface 45 which is of a size slightly smaller than the bore 21 thereby permitting rotation therein and adapted for sealing engagement with the wiper seals 34. The top and bottom surfaces 47 and 48 of the casing 40 are chamfered about the peripheral edges for sealing purposes as will be explained. The top surface 47 is formed with a centrally positioned upright cylindrical wall 49 having a threaded hole 51 therein. Aligned with the axis of the casing 40 and integral therewith is a hexagonal nut 53 positioned centrally of the wall 49 which is usable with a wrench 55 (FIG. 1) to rotate the valve member 25 to various operational positions for reasons to become obvious.

The casing 40 has a fluid flow channel 57 extended transversely of the casing axis selectively movable into alignment with the pair of opposed openings 27 and 28 or the access opening 30 in the valve housing 20. The channel 57 is of an irregular shape having a flapper plate receiving portion 60, an indented flapper support receiving portion 62, and a larger rectangular shaped valve seat portion 63. The flapper plate receiving portion 60 is of an inverted dome shape in transverse cross section.

The flapper valve assembly 42 includes a valve seat member 65 having flapper plate 67 pivotally connected thereto. The valve seat member 65 resembles a chordal portion of a cylinder having a flat surface 68 engageable with the valve seat portion 63 of the channel 57. The outer curved surface of the valve seat member 65 presents a continuation of the casing surface 45 so as to not interfere with rotation of the valve member 25. The valve seat member 65 has a central fluid opening 69 movable into substantial axial alignment with the pair of openings 27 and 28 for fluid flow therebetween. The inner peripheral surface of the fluid opening 69 is chamfered to present an inclined sealing surface 71. Adjacent the upper edge of the valve seat member 65 is a pair of inwardly extended support lugs 72 to which is connected the flapper plate 67.

As shown in FIGS. 4 and 7, the flapper plate 67 is of a circular shape having a main body 74 to which is welded a support arm 75. The body 75 has a tapered surface 77 adapted for engagement with the correspondingly sized and shaped sealing surface 71 of the fluid opening 69 for sealing engagement therewith. The radially outermost portion of the tapered surface 77 is integral with a semi-circular groove 78 adapted to receive an O-ring 80 to positively seal the flapper plate 67 with the valve seat member 65 in the closed position.

On assembly of the valve member 25, the valve seat member 65 is secured to the casing 40 by the bolts 43 with the support lugs 72 extended within the flapper support receiving portion 62 of the fluid flow channel 57. The flapper plate 67 is pivotally connected to the valve seat member 65 by a pin 82 mounted within axially aligned holes on the support arm 75 and the lugs 72 and secured in this assembled position against axial movement by a set screw 83.

The valve member 25 is thereupon mounted within the bore 21 and the upper and lower ends are similarly fluid sealed by removable cover plates 84 and 85, respectively, as shown in the enlarged area of FIG. 5. The lower cover plate 85 is of a disc shape secured to the housing surface 24 by a plurality of bolts 86 with an O-ring seal 88 mounted within a groove 89 in the plate 85. The seal 88 is held under compression with the chamfered edge of the bottom surface 24 for sealing purposes. A step portion 91 is provided in the cover plate 85 to maintain the valve member 25 in a centered position within the bore 21. It is seen that the lower cover plate 85 is readily removed for rapid drainage of the pipe members 17 and 18 on removal of the valve member 25.

The upper cover plate 84 is similarly secured to the surface 23 of the housing 20 as by bolts 91 with an O-ring 92 mounted within a groove 93 in an inner stepped portion 95 as shown in FIG. 5. The O-ring 92 contacts the chamfered valve casing 40 for sealing purposes and the step portion 95 centers the valve member 25 within the bore 21. Centrally of the upper cover plate 84 is an opening 40. A plurality of spaced holes 99 in the ridge 98 are usable in conjunction with a locking Allen screw 101 and the threaded hole 51 in the wall 49 to lock the valve member 25 in a given rotational position.

As shown in FIG. 4, the access opening 30 is closed by a complementary access cover plate 103 secured to the housing 20 by bolts 105 with a gasket 106 sandwiched therebetween for fluid sealing purposes. The inner surfaces of the excess cover plate 103 is of an arcuate shape corresponding to the surface of the bore 21 to provide continuation thereof in an assembled position.

In the use and operation of the applicant's device, the valve means 15 is mounted within a piping system, as for example, to the pipe members 17 and 18 to control fluid flow therebetween. In the open fluid flow position having the channel 57 aligned with the pair of openings 27 and 28, the fluid such as water, oil, or the like is movable in one direction to rotate the flapper plate 67 clockwise as shown in FIG. 8 about the pin 82 to the fully opened position. It is seen that the support arm 75 is movable into the support receiving portion 62 with the flapper plate 67 extended substantially horizontally within the receiving portion 60 without any possible restriction in the fluid flow capacity of the pipe members 17 and 18.

On cessation of the fluid flow pressure in the direction shown in FIG. 8, the weight of the flapper plate 67 in conjunction with the adjacent fluid operates to rotate the same counterclockwise as shown in FIG. 3 into contact with the valve seat member 65. It is seen that the valve means 15 thereupon prevents fluid flow in the opposite direction with the O-ring 80 and the contacting surfaces 71 and 77 cooperating to provide a positive sealing action. This feature is particularly important in piping operations wherein fluids of different compositions are periodically transported through the same pipe lines and the ability to positively separate the same on reaching the desired destination is extremely important. Also, it is desirable that the fluid standing within the pipe lines can be held in this position similar to separate storage tanks without having a slow seepage or intermixing thereof.

Figure 11:
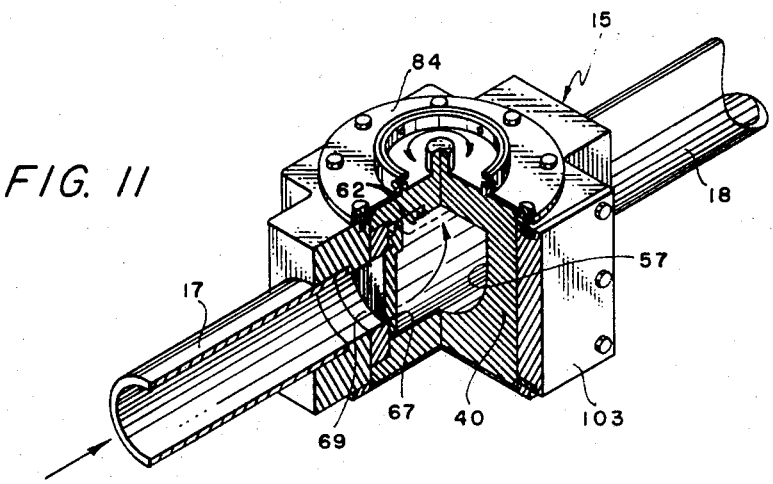
FIG. 11 is a perspective view similar to FIG. 1 illustrating the flapper plate member in the closed position.

The wrench 55 can be used on the hexagonal nut 53 to rotate the valve member 25 180 degrees from the position it is shown in FIG. 8 whereupon the flapper plate 67 similarly acts to permit and restrict fluid flow in the opposite directions as above described but allowing opposite movement of fluid (FIG. 11). It is seen that the novel valve means structure of this invention permits rotation of the valve member 25 at any time notwithstanding the fluid flow conditions then existing within the pipe members 17 and 18 as the flapper plate 67 rotates inwardly of the valve casing 40.

Figure 10:
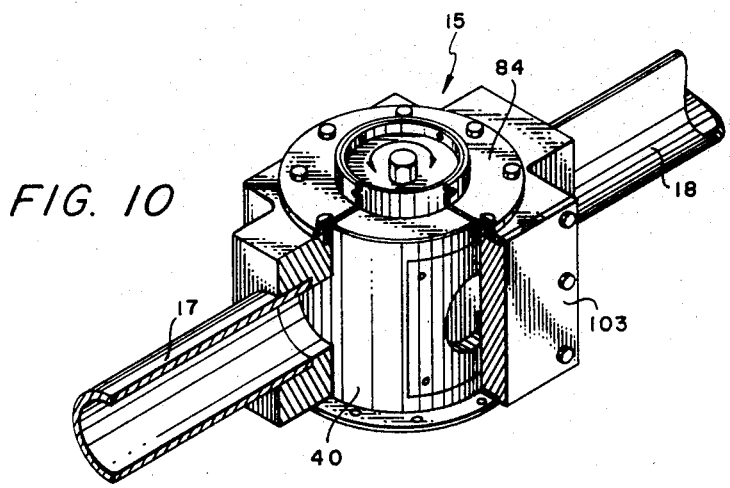
FIG. 10 is a perspective view similar to FIG. 1 illustrating the valve member in a closed or non-flow position.

It is noted that the valve member 25 can be rotated to an intermediate position as shown in FIG. 10 whereby the outer surface of the casing 40 operates to close and seal the opposed openings 27 and 28 in the valve housing 20. The wiper seals 34 are contacting the casing 40 to positively seal the fluid within the piping system. Also, the access plate 103 can be removed for access to the flapper plate 67 to remove any impurities or the like from the sealing surfaces to repair a leak resulting therefrom. Additionally the bolts 86 can be removed to allow removal of the entire flapper valve assembly 42 for repair or replacement. This feature of maintenance without the necessity of draining the pipe members 17 and 18 results in considerable time and labor saving at great monetary savings.

It is obvious that the locking Allen screw 101 is usable to hold the valve member 25 in a given rotational position and prevent vibration and unauthorized persons from altering the direction of the fluid flow.

The valve means of this invention can be used in numerous applications wherein a check valve is needed such as water systems, oil field pumping systems, chemical plants, and the like. The valve means would normally be constructed of a cast metal material; however, it is obvious that non-corrosive materials such as plastics and the like could be used depending on the desired use and nature of the fluid to be conveyed.

As will be apparent from the foregoing description of preferred embodiments of the applicant's valve means a relatively simple and inexpensive valve means has been provided which is readily attachable to existing piping systems so as to provide a positive sealing check valve therebetween. Applicant's construction eliminates a great deal of time consuming and tedious work involved in maintaining a satisfactory piping system operable at all times.

I claim:
1. A valve means for controlling fluid flow comprising:
  (a) a housing having a central bore and a pair of opposed passageways communicating with said bore and extending transversely of said bore,
  (b) a valve assembly rotatably mounted within said bore, said valve assembly including a valve casing have a flow channel movable into alignment with said pair of passageways, a valve seat removably connected to said casing having an opening and a flapper plate pivotally connected to said valve seat operable to close said opening, and said valve seat readily replaceable as required due to wear from contact with said flapper plate,
  (c) means releasably connected to said housing sealing opposite ends of said bore, said sealing means removable to replace all of said valve assembly when required,
  (d) means for rotating said valve assembly to align said channel and said opposed passageways whereby fluid flow is stopped by said flapper plate in one direction and fluid flow in the opposite direction fully opens said flapper plate for unrestricted fluid flow, and
  (e) means connected to said sealing means and said housing to lock said valve assembly in a selected rotational position.

2. A valve means as described in claim 1, wherein:
  (a) said sealing means having an upper cap plate, a lower cap plate, and resilient ring members engageable with said housing in a fluid sealed relationship,
  (b) said upper plate having a central cylindrical upstanding ridge adjacent a similar wall on said valve casing,
  (c) said lock means having a pin member engageable with said wall and said ridge to secure said valve assembly in a given rotational position, and
  (d) said upper and lower cap plates removable to remove said valve assembly from said bore for repair or replacement as required.

3. A valve means as described in claim 1, wherein:
  (a) said housing having an access opening extended into said bore and a cover plate releasably secured thereto, and
  (b) said valve assembly rotatable to a position to align said channel and said access opening whereby said valve seat and said flapper plate are removable for repair and maintenance without requiring draining of the fluid within said passageways, and
  (c) resilient seal strips mounted in said housing positioned in the periphery of and extended parallel to the axis of said bore having an outer portion extended within said bore engageable with said valve casing thereby preventing fluid flow between said passageways and said access opening.

4. A valve means as described in claim 1, wherein:
  (a) said flow channel of trough shape in transverse cross section larger than said passageways having an upper portion adapted to receive said flapper plate in the fully opened position whereby said valve assembly is freely rotatable notwithstanding the operational position of said flapper plate.

References Cited

UNITED STATES PATENTS

| | | | |
|---|---|---|---|
| 3,094,136 | 6/1963 | Bredtschneider | 137—385 |
| 3,146,792 | 9/1964 | Donnelly | 251—315 |
| 3,383,650 | 1/1968 | Scaramucci | 137—614.17 |

FOREIGN PATENTS

| | | |
|---|---|---|
| 753,464 | 2/1967 | Canada. |
| 1,331,963 | 6/1963 | France. |

WILLIAM F. O'DEA, Primary Examiner

H. M. COHN, Assistant Examiner

U.S. Cl. X.R.

137—269.5, 315, 614.2, 614.17; 251—112, 317

UNITED STATES PATENT OFFICE
CERTIFICATE OF CORRECTION

Patent No. 3,474,818                          October 28, 1969

Ralph E. Hartman

It is certified that error appears in the above identified patent and that said Letters Patent are hereby corrected as shown below:

Column 2, line 39, "these" should read -- those --. Column 3, line 72, "75", second occurrence, should read -- 74 --. Column 4, line 35, after "ing" insert -- 97 having an upstanding peripheral ridge 98 mounted about the adjacent cylindrical wall 49 of the valve casing --; line 43, "excess" should read -- access --.

Signed and sealed this 21st day of April 1970.

(SEAL)
Attest:

Edward M. Fletcher, Jr.                    WILLIAM E. SCHUYLER, JR.
Attesting Officer                               Commissioner of Patents